(12) United States Patent
Roby et al.

(10) Patent No.: US 10,903,023 B2
(45) Date of Patent: Jan. 26, 2021

(54) SYSTEM AND METHOD FOR MONITORING CIRCUIT BREAKERS

(71) Applicant: ABB Power Grids Switzerland AG, Baden (CH)

(72) Inventors: David Roby, Barden Ridge (AU); Maciej Orman, Malopolskie (PL); ShunChong Li, Shanghai (CN); Stevan Marinkovic, Wettingen (CH); Yannick Maret, Dättwil (CH)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/394,692

(22) Filed: Apr. 25, 2019

(65) Prior Publication Data
US 2019/0252135 A1   Aug. 15, 2019

Related U.S. Application Data

(63) Continuation of application No. PCT/EP2017/077294, filed on Oct. 25, 2017.

(30) Foreign Application Priority Data

Oct. 25, 2016   (CN) .......................... 2016 1 0934555

(51) Int. Cl.
*H01H 11/00*   (2006.01)
*H01H 71/04*   (2006.01)
(Continued)

(52) U.S. Cl.
CPC ......... *H01H 11/0062* (2013.01); *G01P 13/04* (2013.01); *G01S 17/66* (2013.01);
(Continued)

(58) Field of Classification Search
None
See application file for complete search history.

(56) References Cited

U.S. PATENT DOCUMENTS 5,566,041 A * 10/1996 Rumfield ................. H01H 9/56
                                                    218/154
5,983,162 A * 11/1999 Huang ..................... G06F 17/14
                                                    702/15
(Continued)

FOREIGN PATENT DOCUMENTS

| DE | 102004048985 A1 | 4/2006 |
| DE | 102004053612 A1 | 5/2006 |
| EP | 2405454 A1 | 1/2012 |

OTHER PUBLICATIONS

European Patent Office, International Search Report & Written Opinion issued in corresponding Application No. PCT/EP2017/077294, dated Jan. 18, 2018, 13 pages.

*Primary Examiner* — Curtis A Kuntz
*Assistant Examiner* — Jerold B Murphy
(74) *Attorney, Agent, or Firm* — Sage Patent Group

(57) ABSTRACT

System and method for monitoring a travel curve of moving part of circuit breaker comprising: device for optically monitoring travel path and comprising: light source; light detection device; optical element having plurality of zones with different optical properties which are alternately arranged, the optical element being provided on moving part of circuit breaker, light being intensity-modulated by the optical element and being received by light detection device during circuit breaker operation. The system further comprises an accelerometer mounted to circuit breaker, control unit for receiving signals from light detection device and from accelerometer, the control unit being configured to determine the travel curve based on the detected modulated light and on the detected vibration signal, the vibration (Continued)

signal being employed to identify a change of direction of movement of the moving part.

17 Claims, 2 Drawing Sheets

(51) Int. Cl.
*G01S 17/58* (2006.01)
*G01P 13/04* (2006.01)
*G01S 17/66* (2006.01)
*G08C 23/04* (2006.01)
*H04L 29/08* (2006.01)
*H01H 1/00* (2006.01)

(52) U.S. Cl.
CPC .............. *G08C 23/04* (2013.01); *H04L 67/12* (2013.01); *H01H 2001/0021* (2013.01); *H01H 2071/044* (2013.01)

(56) References Cited

U.S. PATENT DOCUMENTS

| | | | |
|---|---|---|---|
| 6,373,015 B1 * | 4/2002 | Marchand | H02B 13/0354 |
| | | | 218/139 |
| 7,994,444 B2 | 8/2011 | Olszewski et al. | |
| 2007/0078611 A1 * | 4/2007 | Huang | G01H 1/06 |
| | | | 702/56 |
| 2015/0074431 A1 * | 3/2015 | Nguyen | H02J 9/06 |
| | | | 713/300 |
| 2018/0102650 A1 * | 4/2018 | Bourgeau | H02J 3/14 |

* cited by examiner

SYSTEM AND METHOD FOR MONITORING CIRCUIT BREAKERS

BACKGROUND OF THE INVENTION

The subject matter described herein relates generally to systems and methods for monitoring circuit breakers, and more particularly, to such systems and methods with improved precision and reliablity.

Generally, there is a need for measuring, respectively monitoring the travel curves of circuit breakers for purposes of research, and particularly for maintenance of devices in the field. During maintenance, this is necessary to be able to determine actual speed of the breaker stroke, based on which it is possible to estimate the individual breaker wear. The latter is critical for any maintenance related operation. Typically, such measurements are realized by an encoder which is measuring a rotating movement of the shaft. Based on the known geometry of the breaker mechanism for the respective device, it is then possible to convert the determined rotating shaft position into a linear travel curve of the breaker stroke. In existing solutions, such encoders are connected to a data acquisition system which converts the data into a digital format and thus allows further analysis of the acquired data.

The known solutions leave room for improvement. Thus, there is a need for the present invention.

BRIEF DESCRIPTION OF THE INVENTION

According to a first aspect, a system for monitoring the travel curve of a moving part of a circuit breaker is provided. In particular, the system serves for implementing the method described herein. The system comprises: a device for optically monitoring the travel path of a moving part of a circuit breaker, the device comprising: a light source; a light detection device; an optical element having a plurality of zones with different optical properties which are alternately arranged, wherein the optical element is adapted to be provided on a moving part of a circuit breaker to be monitored, and wherein the light source emits light to the optical element which is intensity-modulated by the optical element and received by the light detection device during operation of the circuit breaker. The system further comprises an accelerometer adapted for mounting it to the circuit breaker to be monitored, a control unit for receiving signals from the light detection device and from the accelerometer, the control unit being configured to determine a travel curve of the moving part of the circuit breaker based on the detected modulated light and on the detected vibration signal, wherein the vibration signal is employed to identify a change of direction of movement of the moving part of the circuit breaker.

According to a further aspect, a method for monitoring the travel curve of a moving part of a circuit breaker is provided. In particular, the method is implemented in a system as described herein. The method comprises the steps of illuminating, with a light source, an optical element having a plurality of zones with different optical properties which are alternately arranged, the optical element being attached to a moving part of a circuit breaker to be monitored; activating a switching process of the circuit breaker; detecting light modulated by the optical element; detecting vibrations of the circuit breaker with the accelerometer; determining, using information processed from the detected modulated light and information derived from the detected vibration signal, a travel curve of the circuit breaker during the switching process; wherein the vibration signal is employed to identify a change of direction of movement of the moving part of the circuit breaker.

Generally, the system and method according to embodiments is based on measurements of reflection of (laser or LED) light, which are combined with vibration measurements realized by, e.g., an accelerometer.

Further aspects, advantages and features of the present invention are apparent from the dependent claims, the description and the accompanying drawings.

BRIEF DESCRIPTION OF THE DRAWINGS

A full and enabling disclosure, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, an electrical contact through which the nominal current passes, is called a main contact or nominal contact, and the combination of a main contact and an arcing contact is called henceforth "breaker contact" or "moving contact". The circuit breaker comprises two breaker contacts or moving contacts, each comprising a main contact and an arcing contact.

In embodiments described, circuit breakers for interrupting a current between a first breaker contact and a second breaker contact are employed and monitored or tested. Thereby, systems and methods disclosed herein may be employed from medium voltage to high voltage circuit breakers, that is, from about 6 kV to more than 1.100 kV.

Within the following description of the drawings, the same reference numbers refer to the same components. Generally, only the differences with respect to the individual embodiments are described.

Generally, a circuit breaker to be monitored is equipped, on a moving part thereof, with a reflective stripe, bar, or the like, which contains, in an alternating manner, areas of a material that reflects light, and areas that absorb it. While this reflective item is moving due to a switching of the circuit breaker, light from a light source, such as a laser, is reflected while passing reflective areas and not reflected while passing non-reflective areas. Since the dimensions of the areas are known, it is possible to correlate a detected reflection signal to a movement distance, and also to calculate speed therefrom. While the former is useful for monitoring the distance about which the moving part of the breaker has moved, it is not perfect for detecting if the direction of movement has been reversed during the measurement. That is, while the light detector will continuously detect changes between dark and light, it might occur that the moving part of the breaker has rebounced during the monitored time interval. In order to account for such direction changes, an accelerometer is employed. It detects vibrations of the housing, or the moving part, of the circuit breaker. It has been found by the inventors that a change in direction of the moving part of the circuit breaker, namely if it has hit an internal limitation and bounces back, this results in a characteristic signal in the accelerator. Thus, this signal is employed, according to embodiments, for determining at which point or points in time the direction of movement has changed, which is accounted for in the calculated travel path.

Figure 1:
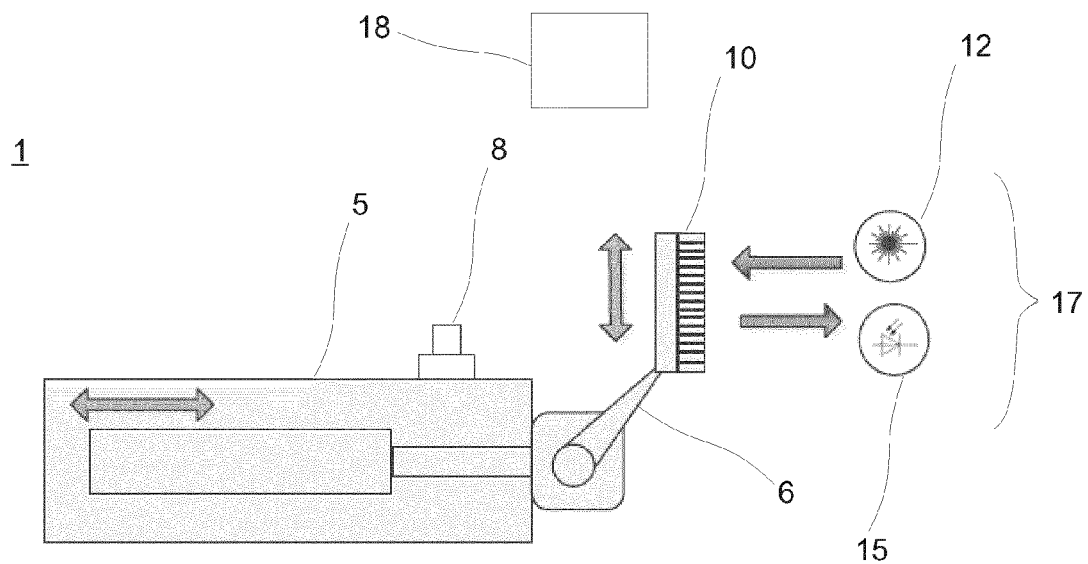
FIG. 1 shows a schematic cross-sectional view of a system according to embodiments.

FIG. 1 shows a system 1 for monitoring the travel curve of a moving part of a circuit breaker 5 according to embodiments, which is employed on a circuit breaker 5 (which is not part of the system 1). The system 1 comprises a device 17 for optically monitoring the travel path of a moving part 6 of the circuit breaker 5. The device 17 comprises a light source 12, a light detection device 15, and an optical element 10 having a plurality of zones with different optical properties (typically, reflection is employed) which are alternately arranged. This optical element 10 is adapted to be provided on the moving part 6 of the circuit breaker 5, for example by an adhesive material (only schematically shown in FIG. 1).

During operation of the system 1, that is when a travel curve is to be monitored during a switching operation of the circuit breaker 5, the light source 12 emits light to the optical element 10. The light is then intensity-modulated (due to the different reflection characteristics of the zones) by the optical element 10 and received by the light detection device 15 while the circuit breaker 5 is operating. The system 1 further comprises an accelerometer 8 adapted for mounting it to the circuit breaker 5. A control unit 18 is adapted for receiving signals from the light detection device 15 and from the accelerometer 8. From the derived signals, the control unit 18 determines a travel curve of the moving part 6 of the circuit breaker 5 by using the detected modulated light and the detected vibration signal. Thereby, the vibration signal is employed to identify a change of direction of movement of the moving part 6 of the circuit breaker 5, as will be laid out in greater detail below.

Figure 2:
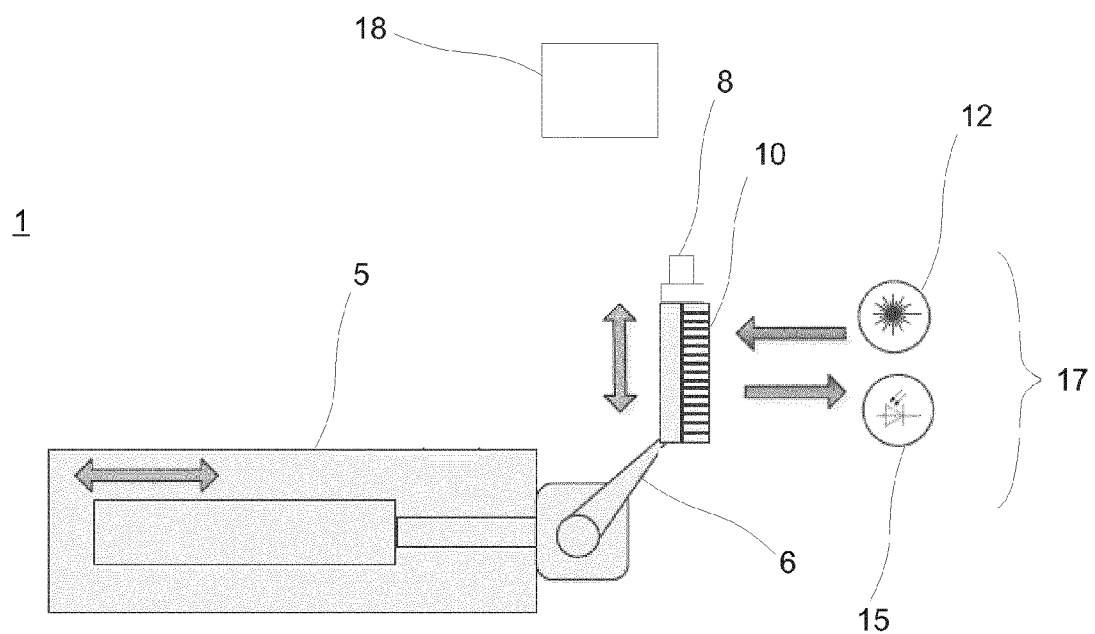
FIG. 2 shows a schematic cross-sectional view of a system according to further embodiments.

In embodiments, the accelerometer 8 is typically attached to the housing of the circuit breaker 5, preferably adjacent to the moving part 6. It can also be attached directly to the moving part 6 of the circuit breaker 5, which is schematically shown in FIG. 2.

In embodiments, the control unit 18 is typically configured to process the detected vibration signal from the accelerometer with the empirical mode decomposition (EMD) method which is known in the art. With this signal decomposition technique, the original, raw data from the accelerometer 8 is broken up into a number of so called Intrinsic Mode Functions (IMF) which, when summed up, result in the original signal. This technique is known to those skilled in the art and shall not be further discussed here.

In further embodiments, the control unit 18 may be configured to process the vibration signal employing by double integration. This is applicable when the accelerometer is mounted at the moving part 6 of the breaker.

The light source 12 may typically be a laser, or a light emitting diode (LED).

A method for monitoring the travel curve of a moving part 6 of a circuit breaker 5 according to embodiments may be described as follows: With the light source 12, the optical element 10 is illuminated, which has a plurality of zones with different optical properties which are alternately arranged. For the monitoring, a switching process of the circuit breaker 5 is initiated, and during the switching process, light modulated by the optical element 10 is detected with the light detection element 15. At the same time, vibrations of the circuit breaker 5 are detected with the accelerometer 8. By using information processed from the detected modulated light, and information derived from the detected vibration signal, a travel curve of the circuit breaker 5 during the switching process is calculated. Thereby, the vibration signal is employed to identify a change of direction of movement of the moving part 6 of the circuit breaker 5. Typically, the vibration signal is processed employing an empirical mode decomposition (EMD).

Figure 3:
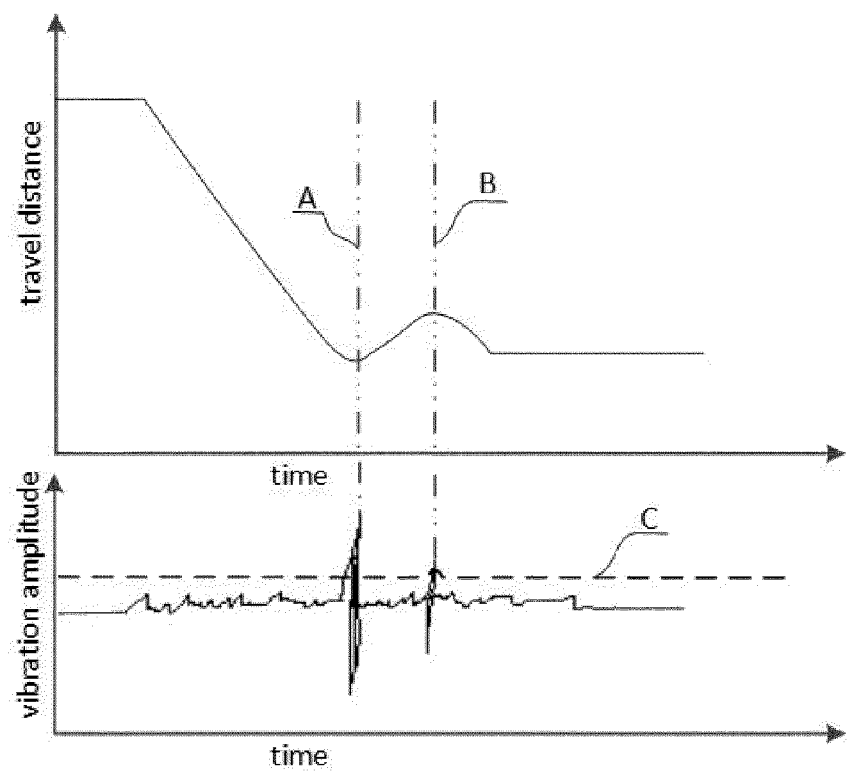
FIG. 3 schematically shows a diagram of the travel curve of a circuit breaker as determined according to embodiments, together with detected vibrations.

In FIG. 3, the upper diagram schematically shows the derived travel distance over time of the moving part 6 of the circuit breaker 5 to be tested, according to a configuration such as shown in FIG. 1. Thereby, at time A, the direction is reversed, which relates, e.g., to the rebouncing of a moving part 6 of the circuit breaker 5 from an end position. In the lower diagram in FIG. 3, the respective vibration signal can be seen which is above a trigger threshold C. A second change of direction occurs at time B, after which the moving part comes to a halt in its end position (end of line in upper diagram). The respective vibration signals from the accelerometer are shown in the lower diagram of FIG. 3.

Figure 4:
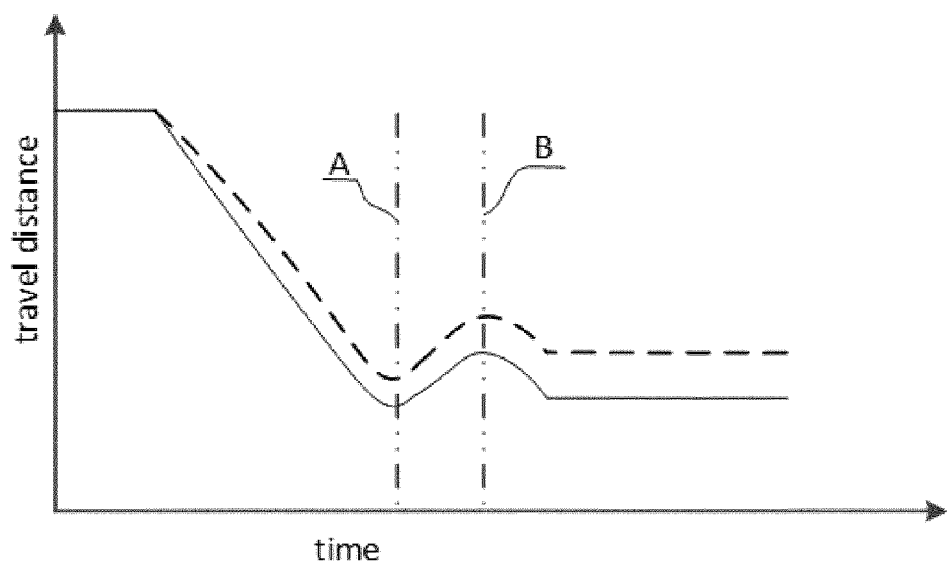
FIG. 4 schematically shows a diagram of the travel curve of a circuit breaker as determined according to embodiments.

FIG. 4 schematically shows (as a solid line) the travel distance over time of the moving part 6 of the circuit breaker 5 to be tested, according to a configuration such as shown in FIG. 2. Thereby, the accelerometer 8 is positioned on the moving part 6 of the circuit breaker 5. The dashed line is calculated by double integrating (over time) a signal from the accelerometer 8, which yields the distance traveled by the accelerometer 8. As the latter is attached to the moving part 6, the double integrated accelerometer signal yields the travel distance of the moving 6 part to which it is attached. This information may in embodiments be employed by the control unit 18 in conjunction with the information, as shown in FIG. 3, about the reversal of movement, to calculate the travel curve. Using both types of information can further improve the overall precision of the system and method as described herein.

Generally, the system as described herein can be designed to be movable and detachable for use, e.g., by field technicians, or can be designed to be stationary. Thus, the optical element 10 can for example be an adhesive tape with intermittently printed dark zones, which is then attached to a moving part accessible from outside of the circuit breaker. Also, the optical element may be attached to a part which is positioned inside a GIS component, for example, and the light may be illuminated thereon through a window.

The control unit can be a computer such as a standard computer, a handheld computer, a tablet computer, a smartphone, or the like. The light detection device 15 and the accelerometer 8 can be attached to the control unit via interface hardware having a standard interface, such as USB, at its output section towards the computer, the interface hardware being regarded herein as a part of the control unit.

Exemplary embodiments of systems and methods for monitoring the travel curve of a moving part of a circuit breaker are described above in detail. The systems and methods are not limited to the specific embodiments described herein, but rather, components of the systems and/or steps of the methods may be utilized independently and separately from other components and/or steps described herein, and are not limited to practice with only a circuit breaker as described herein. Rather, the exemplary embodiments can be implemented and utilized in connection with many other circuit breaker applications.

Although specific features of various embodiments of the invention may be shown in some drawings and not in others, this is for convenience only. In accordance with the principles of the invention, any feature of a drawing may be referenced and/or claimed in combination with any feature of any other drawing. In particular, FIG. 1 illustrates different aspects which may be combined with other general aspects of the present disclosure.

In embodiments of the system described herein, the control unit 18 comprises or is connected to a network interface designed for connecting to a data network, such that the system is operatively connected to the network interface for at least one of: sending system status information to the data network and carrying out a command received from the data network, in particular the data network being at least one of: LAN, WAN or internet (IoT).

In embodiments of the method described herein, the method comprises an additional step of connecting, via a network interface, to a data network, such that the additional step comprises at least one of: sending status information, in particular about the circuit breaker (5), to the data network and carrying out a command received from the data network, in particular the data network being at least one of: LAN, WAN or internet (IoT).

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for monitoring the travel curve of a moving part of a circuit breaker, the system comprising:
    a device for optically monitoring the travel path of a moving part of a circuit breaker, the device comprising:
        a light source,
        a light detection device,
        an optical element having a plurality of zones with different optical properties which are alternately arranged, wherein the optical element is adapted to be provided on a moving part of a circuit breaker to be monitored, and wherein the light source emits light to the optical element which is intensity-modulated by the optical element and received by the light detection device during operation of the circuit breaker,
        an accelerometer adapted for mounting it to the circuit breaker to be monitored, wherein the accelerometer is attached to the moving part of the circuit breaker,
        a control unit for receiving signals from the light detection device and from the accelerometer, the control unit being configured to determine a travel curve of the moving part of the circuit breaker based on the detected modulated light and on the detected vibration signal, wherein the vibration signal is employed to identify a change of direction of movement of the moving part of the circuit breaker.

2. The system according to claim 1,
    wherein the system illuminates, with a light source, an optical element having a plurality of zones with different optical properties which are alternately arranged, the optical element being attached to a moving part of a circuit breaker to be monitored, activate a switching process of the circuit breaker,
    wherein the system detects light modulated by the optical element,
    wherein the system detects vibrations of the circuit breaker with the accelerometer,
    wherein the system determines, using information processed from the detected modulated light and information derived from the detected vibration signal, a travel curve of a moving part of the circuit breaker during the switching process, and
    wherein the vibration signal is employed to identify a change of direction of movement of the moving part of the circuit breaker.

3. The system of claim 1, wherein the control unit is configured to process the detected vibration signal with the empirical mode decomposition (EMD) method.

4. The system of claim 1, wherein the control unit is configured to process the vibration signal employing double integration.

5. The system of claim 1, wherein the light source is at least one of: a laser, and a light emitting diode (LED).

6. The system of claim 1, wherein the zones with different optical properties which are alternately arranged comprise zones having a higher reflectivity and zones having a lower reflectivity.

7. The system of claim 1, wherein the control unit comprises or is connected to a network interface designed for connecting to a data network, such that the system is operatively connected to the network interface for at least one of: sending system status information to the data network and carrying out a command received from the data network.

8. The system of claim 7, wherein the data network being at least one of: LAN, WAN or internet (IoT).

9. The system of claim 1, wherein the control unit is configured to process the detected vibration signal with the empirical mode decomposition (EMD) method.

10. The system of claim 1, wherein the control unit is configured to process the vibration signal employing double integration.

11. The system of claim 1, wherein the accelerometer is attached to at least one of: a. a housing of the circuit breaker adjacent to the moving part; and b. the moving part of the circuit breaker.

12. A method for monitoring the travel curve of a moving part of a circuit breaker, the method comprising:
    illuminating, with a light source, an optical element having a plurality of zones with different optical properties which are alternately arranged, the optical element being attached to a moving part of a circuit breaker to be monitored,
    activating a switching process of the circuit breaker,
    detecting light modulated by the optical element, detecting vibrations of the circuit breaker with the accelerometer, wherein the accelerometer is attached to the moving part of the circuit breaker, determining, using information processed from the detected modulated light and information derived from the detected vibration signal, a travel curve of the circuit breaker during the switching process, wherein the vibration signal is employed to identify a change of direction of movement of the moving part of the circuit breaker.

13. The method of claim 12, which further comprises an additional step of connecting, via a network interface, to a data network, such that the additional step comprises at least one of: sending status information, to the data network and carrying out a command received from the data network.

14. The method of claim 12, wherein the vibration signal is processed employing an empirical mode decomposition (EMD) method.

15. The method of claim 12, wherein the vibration signal is processed employing double integration.

16. The method of claim 12, wherein the zones with different optical properties which are alternately arranged comprise zones having a higher reflectivity and zones having a lower reflectivity.

17. The method of claim 12, wherein the status information are about the circuit breaker.

* * * * *